No. 782,560.

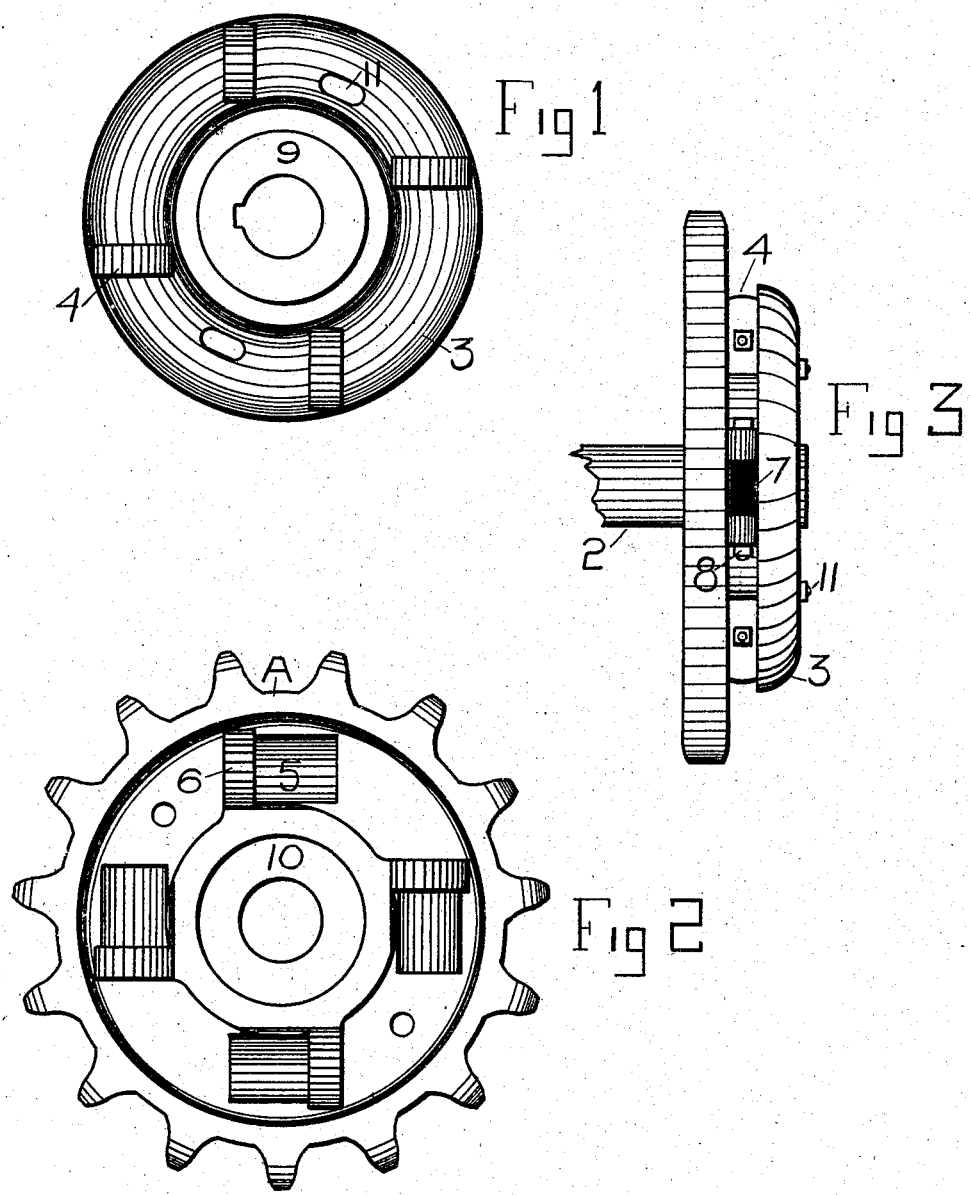

Patented February 14, 1905.

UNITED STATES PATENT OFFICE.

GEORGE H. HARRIS, OF STOCKTON, CALIFORNIA.

ELASTIC POWER-TRANSMISSION DEVICE.

SPECIFICATION forming part of Letters Patent No. 782,560, dated February 14, 1905.

Application filed January 15, 1904. Serial No. 189,088.

*To all whom it may concern:*

Be it known that I, GEORGE H. HARRIS, a citizen of the United States, residing at Stockton, in the county of San Joaquin and State of California, have invented new and useful Improvements in Elastic Power-Transmission Devices, of which the following is a specification.

My invention relates to a device for transmitting power and relieving the jar and shock due to intermittent or irregular impulses between the two parts.

It comprises details of construction which will be more fully explained by reference to the accompanying drawings, in which—

Figure 1 is a front elevation of the concaved disk. Fig. 2 is a front elevation of a sprocket-wheel with lugs and concavities for rubber bumpers. Fig. 3 is a side elevation of the several parts in combination.

In the transmitting of power from apparatus which is subject to irregular impulses, such as gas-engines, or where the power may be regular, but there are irregular strains upon the part to which the power is transmitted, it is desirable to relieve the parts of the sudden shock of these changes without injuriously affecting the actual transmission.

My invention may be applied to chain sprocket or gear driving with advantage, and in the present illustration I have shown it as applied to a chain-sprocket driving, in which A is a sprocket-wheel through which power is to be transmitted. This wheel is turnable loosely upon the bearing-shaft, as at 2, and 3 is a disk or equivalent spider which is secured to the shaft by key or otherwise. The disk is preferably made concaved on the side adjacent to the sprocket and has lugs fixed to it, as at 4. The sprocket has concavities made in it, as at 5, and lugs 6 contiguous to these concavities and corresponding with the lugs 4 of the disk, but so formed as to stand at a short distance away from these lugs.

7 represent cushions or springs of any suitable or desired description. These springs may either be of elastic, rubber, or they may be in the form of spiral or other springs and are located between the lugs 4 and 6. As at present shown, the springs are in the form of elastic cylinders adapted to lie between the concaves 5 of the sprocket and the concaved inner face of the disk. Holes are made through the lugs 4 and 6, and the springs have central openings, so that bolts, as at 8, may pass through corresponding openings in the lugs 4 and 6 and through the spring 7, so as to retain the latter in position and to hold the parts firmly together.

In order to insure the proper and steady running of the parts, I have shown the disk made with an enlarged hub, as at 9, and the sprocket A is made with a corresponding hole, as at 10, which fits over the hub when the parts are in position, thus insuring the steady running of the two in unison.

In order to prevent the parts from being separated, I have shown the disk and the sprocket as having perforations through which bolts pass, as at 11, these bolts and the nuts thereon serving to retain the parts together as a unitary structure. The openings through which the bolts 11 pass are preferably elongated in the direction of rotation, so that any yielding of the springs or cushions by variation in the power transmitted will be permitted by the movement of the bolts in these slots.

Having thus described my invention, what I claim, and desire to secure by Letters Patent, is—

A device of the character described consisting of a shaft, a disk loose thereon and having a projecting hub, a second disk fixed to the shaft said second disk having a concaved channel opposing the adjacent side of the other disk and said other disk having concavities arranged equidistant in its side with lugs projecting laterally from the ends of said concavities, other lugs projecting laterally from the channel of the first-named disk and overlapping and spaced from the first-named lugs, elastic cushions interposed between the lugs, bolts extending through the lugs and cushions, other bolts parallel with the shaft and connecting the two disks, one of said disks having sprocket-teeth and the other disk having slots for the second-named bolts whereby one disk is movable axially relative to the other.

In testimony whereof I have hereunto set my hand in presence of two subscribing witnesses.

GEORGE H. HARRIS.

Witnesses:
H. G. WILLIAMSON,
JAMES TRETHEWAY.